US011874611B2

(12) United States Patent
Okazaki

(10) Patent No.: US 11,874,611 B2
(45) Date of Patent: Jan. 16, 2024

(54) IMAGE FORMING DEVICE AND FOGGING MARGIN DETERMINATION METHOD

(71) Applicant: KONICA MINOLTA, INC., Tokyo (JP)

(72) Inventor: Futoshi Okazaki, Aichi Prefecture (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/894,436

(22) Filed: Aug. 24, 2022

(65) Prior Publication Data

US 2023/0111322 A1 Apr. 13, 2023

(30) Foreign Application Priority Data

Oct. 13, 2021 (JP) ................................ 2021-168316

(51) Int. Cl.
*G03G 15/06* (2006.01)

(52) U.S. Cl.
CPC .................................. *G03G 15/065* (2013.01)

(58) Field of Classification Search
CPC .................................................... G03G 15/065
See application file for complete search history.

(56) References Cited

U.S. PATENT DOCUMENTS

2021/0373453 A1* 12/2021 Okayasu

FOREIGN PATENT DOCUMENTS

JP 2009271240 A 11/2009
JP 2017072629 A 4/2017

* cited by examiner

*Primary Examiner* — Victor Verbitsky
(74) *Attorney, Agent, or Firm* — BUCHANAN INGERSOLL & ROONEY PC

(57) ABSTRACT

An image forming device including an image carrier, a charge device, a developer device, power supply circuitry that applies a charge bias and a developer bias to the charge device and the developer device, respectively, a detector, and a hardware processor that operates as: a control unit that changes a fogging margin, which is a difference between charge bias and developer bias, and controls the power supply circuitry to set the charge bias and developer bias accordingly; a calculation unit that calculates amounts of change between detected values; and a determination unit that obtains differences between amounts of change, determines whether each difference is less than a defined value, and determines a position of a boundary between a first range greater than or equal to the defined value and a second range less than the defined value as a fogging margin to be used in forming a print image.

8 Claims, 13 Drawing Sheets

Image forming device

IMAGE FORMING DEVICE AND FOGGING MARGIN DETERMINATION METHOD

The entire disclosure of Japanese patent Application No. 2021-168316, filed on Oct. 13, 2021, is incorporated herein by reference in its entirety.

BACKGROUND

Technical Field

The present disclosure relates to electrophotographic image forming devices, and more particularly to a technique for stabilizing an amount of toner fogged on a surface of an image carrier.

Related Art

In an image forming device that forms an image by an electrophotographic method, a photoconductor is uniformly charged, then an electrostatic latent image is formed on the photoconductor, then developer containing toner is supplied from a developer device to the electrostatic latent image to form a toner image. After a formed toner image is transferred to a recording material or the like, residual toner remaining on the photoconductor is removed by a blade.

In order to suppress wear on the photoconductor and the blade to extend life of the photoconductor and the blade, a small amount of toner particles are supplied from the developer device to the photoconductor as lubricant at a certain timing, to reduce friction between an edge of the blade and the photoconductor. The toner particles preferably contain lubricant particles such as zinc as an external additive.

According to a conventional technique (JP 2009-271240 A), fogging toner concentration on the photoconductor is measured by using an optical sensor to measure concentration of a control toner image formed on the photoconductor. When fogging toner concentration exceeds a defined value, a transfer bias is increased by a defined amount within a range of acceptable decrease in transfer efficiency. As a result, fogging toner transfer efficiency is decreased, suppressing toner adhering to white background portions of an image, thereby decreasing visibility of conspicuous background staining.

SUMMARY

However, even if to suppress wear of the photoconductor and blade, if toner is supplied to a surface of the photoconductor as a fogging image, an amount of toner consumed increase accordingly, and therefore it is desirable that as little toner as possible is supplied while still suppressing wear. As described above, fogging toner supplied to a surface of the photoconductor must be a very small amount, and therefore detecting fogging toner of the surface of the photoconductor by using an optical sensor as described in JP 2009-271240 A is difficult due to the sensitivity of the optical sensor. Therefore, whether an amount of toner fogged on the surface of the photoconductor is actually an appropriate amount is unknown.

An object of the present disclosure is to solve the technical problem described above, and provide an electrophotographic image forming device capable of supplying a more stable amount of fogging toner onto a photoconductor than conventional devices, and provide a fogging margin determination method for appropriately determining a fogging margin that affects an amount of fogging toner.

To achieve at least one of the abovementioned objects, an image forming device reflecting one aspect of the present disclosure forms a fogging image using developer prior to forming a print image, the image forming device comprising: an image carrier; a charge device that electrically charges a surface of the image carrier; a developer device that supplies developer to the image carrier; power supply circuitry that applies a charge bias to the charge device and applies a developer bias to the developer device; a detector that detects the fogging image formed on the image carrier; a non-transitory computer-readable recording medium comprising a program; and a hardware processor that executes the program to operate as: a control unit that changes a fogging margin, which is a difference between charge bias and developer bias, in steps, controls the power supply circuitry so that the charge bias and developer bias are set according to the steps, and controls the detector to detect for each step; a calculation unit that calculates, for each step, an amount of change between a detection value detected by the detector and a detection value detected by the detector for a next step in sequence; and a determination unit that obtains, for each step, a difference between an amount of change calculated by the calculation unit and an amount of change calculated by the calculation unit for a subsequent step in the sequence, determines whether or not each obtained difference is greater than or equal to a defined value, and upon obtaining a first fogging margin range of at least one difference greater than or equal to the defined value and a second fogging margin range of at least one difference less than the defined value, determines a position of a boundary between the first range and the second range as a fogging margin to be used in forming the print image.

An image forming device reflecting another aspect of the present disclosure forms a fogging image on a photoconductor as an image carrier using developer prior to forming a print image, the image forming device comprising: the image carrier; a charger device that electrically charges a surface of the image carrier; a developer device that supplies developer to the image carrier; an intermediate transfer body that carries the fogging image transferred from the image carrier; power supply circuitry that applies a charge bias to the charger device and applies a developer bias to the developer device; a detector that detects the fogging image on the intermediate transfer body; a non-transitory computer-readable recording medium comprising a program; and a hardware processor that executes the program to operate as: a control unit that changes a fogging margin, which is a difference between charge bias and developer bias, in steps, controls the power supply circuitry so that the charge bias and developer bias are set according to the steps, and controls the detector to detect for each step; a calculation unit that calculates, for each step, an amount of change between a detection value detected by the detector and a detection value detected by the detector for a next step in sequence; and a determination unit that obtains, for each step, a difference between an amount of change calculated by the calculation unit and an amount of change calculated by the calculation unit for a subsequent step in the sequence, determines whether or not each obtained difference is greater than or equal to a defined value, and upon obtaining a first fogging margin range of at least one difference greater than or equal to the defined value and a second fogging margin range of at least one difference less than the defined value, determines a position of a boundary between the first range and the second range as a fogging margin to be used in forming the print image.

A fogging margin determination method reflecting another aspect of the present disclosure is used in an image forming device that forms a fogging image prior to forming a print image, comprising an image carrier, a charge device that electrically charges a surface of the image carrier, a developer device that supplies developer to the image carrier, and power supply circuitry that applies a charge bias to the charge device and applies a developer bias to the developer device, the fogging margin determination method comprising: detecting the fogging image formed on the image carrier; changing a fogging margin, which is a difference between charge bias and developer bias, in steps, controlling the power supply circuitry so that the charge bias and developer bias are set according to the steps, and controlling the detector to detect for each step; calculating, for each step, an amount of change between a detection value detected and a detection value detected for a next step in sequence; obtaining, for each step, a difference between an amount of change calculated and an amount of change calculated for a subsequent step in the sequence, determining whether or not each obtained difference is greater than or equal to a defined value, and upon obtaining a first fogging margin range of at least one difference greater than or equal to the defined value and a second fogging margin range of at least one difference less than the defined value, determining a position of a boundary between the first range and the second range as a fogging margin to be used in forming the print image.

BRIEF DESCRIPTION OF DRAWINGS

The advantages and features provided by one or more embodiments of the disclosure will become more fully understood from the detailed description given hereinbelow and the appended drawings which are given by way of illustration only, and thus are not intended as a definition of the limits of the invention. In the drawings.

EMBODIMENTS

Hereinafter, one or more embodiments of the present disclosure will be described with reference to the drawings. However, the scope of the invention is not limited to the disclosed embodiments.

1. Embodiment 1

The following describes an image forming device 5 as Embodiment 1 according to the present disclosure, with reference to the drawings.

1.1. Image Forming Device 5

Figure 1A:
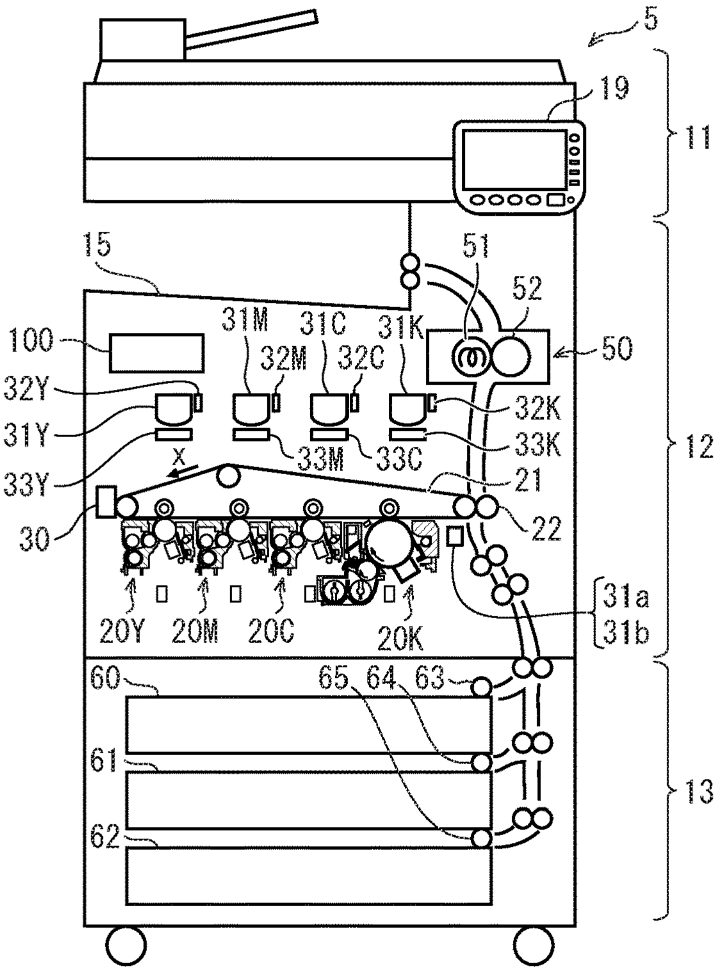
FIG. 1A illustrates a schematic cross-section of an image forming device 5.

As illustrated in FIG. 1A, the image forming device 5 is a tandem type of color multifunction peripheral (MFP) having functions such as those of a scanner, printer, and copier.

As illustrated, the image forming device 5 is provided with a sheet feeder 13 at a bottom of a housing, for accommodating and feeding out sheets. Above the sheet feeder 13 is a printer 12 that forms an image by an electrophotographic method. Above the printer 12 is an image reader 11 that scans a document to generate image data and an operation panel 19 that displays an operation screen and receives input operations from a user.

The image reader 11 includes an automatic document feeder (ADF). The ADF feeds documents set on a document tray sheet by sheet to a document glass plate via a feed path. The image reader 11 scans a document fed to a defined position on the document glass plate by the ADF or, by moving a scanner, scans a document placed on the document glass plate by a user, and acquires image data consisting of red (R), green (G), and blue (B) multi-value digital signals.

Image data of each color component acquired by the image reader 11 undergoes various data processing by control circuitry 100 and is further converted into reproduction color image data in yellow (Y), magenta (M), cyan (C), and black (K) colors.

The printer 12 includes an intermediate transfer belt 21 held taut by a drive roller, a driven roller, and a backup roller, a secondary transfer roller 22, imaging units 20Y, 20M, 20C, 20K disposed facing the intermediate transfer belt 21 at defined intervals along a travel direction X of the intermediate transfer belt 21, sensors 31*a*, 31*b*, a fixing unit 50, and the control circuitry 100.

Figure 1B:
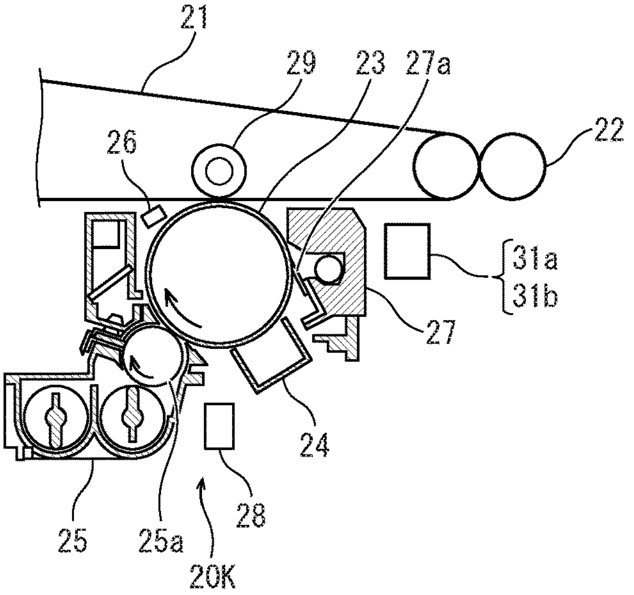
FIG. 1B illustrates a schematic cross-section of an imaging unit 20K.

The imaging units 20Y, 20M, 20C, 20K form Y, M, C, K color toner images, respectively. As an example, as illustrated in FIG. 1B, the imaging unit 20K includes a photoconductor drum 23 that is an image carrier, a light emitting diode (LED) array 28 for exposure scanning of a surface of the photoconductor drum 23, a charge device 24, a developer device 25 provided with a developer roller 25*a*, a sensor 26, a cleaner 27, and a primary transfer roller 29. The imaging units 20Y, 20M, 20C also have the same structure as the imaging unit 20K.

Figure 2A:
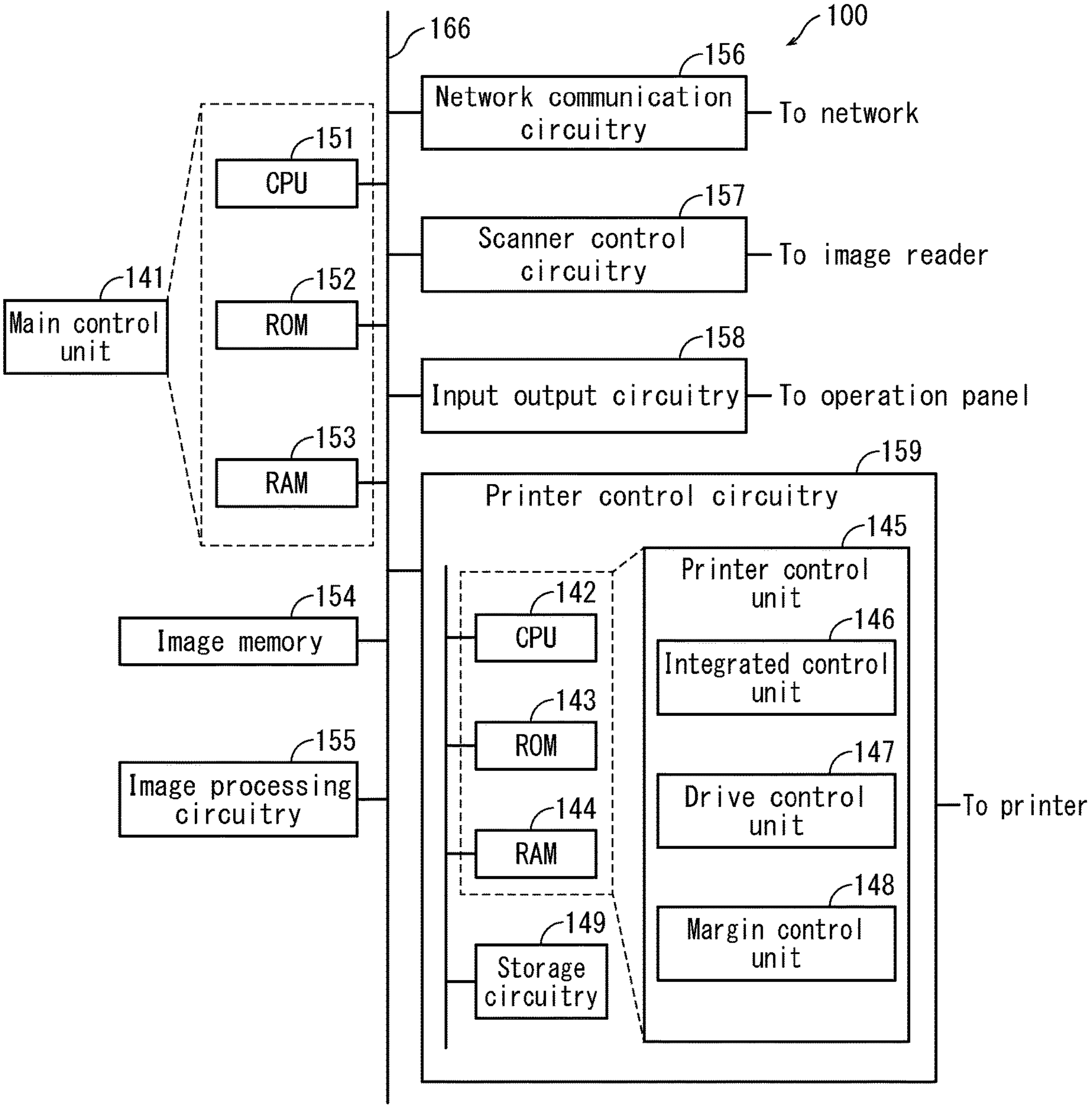
FIG. 2A is a block diagram illustrating structure of control circuitry 100.
Figure 2B:
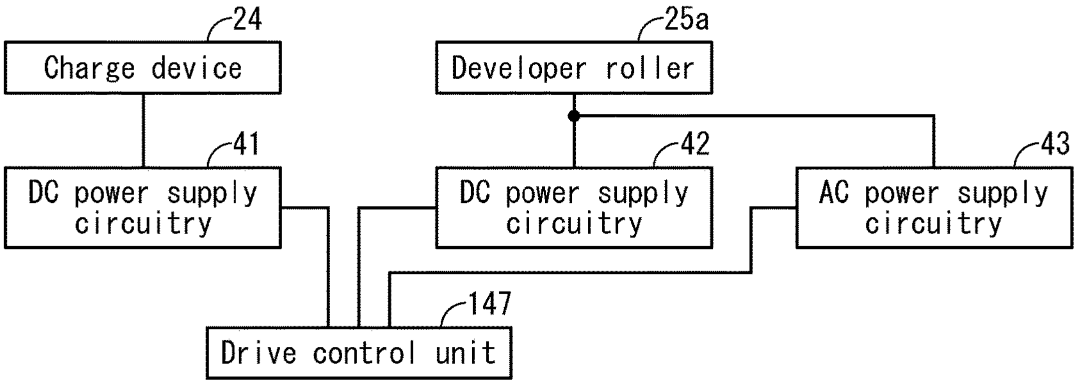
FIG. 2B is a block diagram illustrating structure that supplies voltage to a charge device 24 and a developing roller 25*a*.

Further, as illustrated in FIG. 2B, under control of a drive control unit 147 described later and for each Y, M, C, K color, the printer 12 includes a DC power supply circuit 41 that applies a DC voltage having a variable potential to the charge device 24 and a DC power supply circuit 42 that applies a DC voltage having a variable potential to the developer roller 25*a* of the developer device 25. Further, the printer 12 may optionally include an AC power supply circuit 43 that applies an AC (square wave) voltage having variable potential to the developer roller 25*a* of the developer device 25.

Returning to FIG. 1A, detachable toner bottles 31Y, 31M, 31C, 31K are provided above the intermediate transfer belt 21, sandwiching the intermediate transfer belt 21 above the imaging units 20Y, 20M, 20C, 20K, respectively. The toner bottles 31Y, 31M, 31C, 31K contain Y, M, C, K color toners, respectively, and supply toner to the imaging units 20Y, 20M, 20C, 20K by toner supply mechanisms 33Y, 33M, 33C, 33K, respectively.

Further, on sides of the toner bottles 31Y, 31M, 31C, 31K are provided sensors 32Y, 32M, 32C, 32K that detect when toner contained in the toner bottles 31Y, 31M, 31C, 31K has become empty.

The sheet feeder 13 includes sheet cassettes 60, 61, 62 that accommodate sheets of different sizes and pickup rollers 63, 64, 65 for feeding sheets from the sheet cassettes to a conveyance path.

In the imaging unit 20K (FIG. 1B), a circumferential surface of the photoconductor drum 23 is uniformly and negatively charged by the charge device 24, and exposed by the LED array 28 to form an electrostatic latent image on the surface of the photoconductor drum 23. The electrostatic latent image is developed by the developer device 25 to form a K color toner image or a fogging image on the surface of the photoconductor drum 23. Here, a toner image is a print image formed by a print operation according to a normal print job, and a fogging image is a toner image formed in fogging margin determination processing to determine an appropriate value of a fogging margin that affects an amount of toner fogging, formed at a time when a print job is not executed, for example during a period from when power is switched on to the start of a first print job. An appropriate amount of toner for a fogging image is, for example, 1 milligram (mg) to 5 mg per sheet (A4 size conversion).

The sensor 26 (detector) scans a toner image or fogging image formed on the surface of the photoconductor drum 23. More specifically, the sensor 26 is a reflective optical sensor disposed close to the surface of the photoconductor drum 23, and irradiates the surface of the photoconductor drum 23 with light of a defined wavelength. Light emitted towards the surface of the photoconductor drum 23 is diffusely reflected by the surface of the photoconductor drum 23 or a shield (toner image or fogging image) formed on the surface of the photoconductor drum 23. The sensor 26 detects, from the diffusely reflected light, light that is reflected in the direction of the sensor 26. The sensor 26 outputs a detection value indicating an amount of detected light.

A toner image or fogging image is transferred onto a surface of the intermediate transfer belt 21 by electrostatic action of the primary transfer roller 29 disposed in contact with a back surface side of the intermediate transfer belt 21. The same is true for each of the imaging units 20Y, 20M, 20C.

The cleaner 27 of the imaging unit 20K includes a blade 27*a* that is in contact with the surface of the photoconductor drum 23. After the toner image or fogging image formed on the surface of the photoconductor drum 23 is transferred onto the intermediate transfer belt 21, the blade 27*a* collects toner left on the surface of the photoconductor drum 23. The same is true for each of the imaging units 20Y, 20M, 20C.

Imaging timing for each color is staggered so that toner images in colors Y, M, C, K are transferred onto the same point on the intermediate transfer belt 21.

Instead of the sensor 26, sensors 31*a*, 31*b* (detectors) may be used to scan the toner image or fogging image on the intermediate transfer belt 21, after transfer from the photoconductor drum 23. The sensors 31*a*, 31*b* are optical sensors having a similar structure to the sensor 26. The sensors 31*a*, 31*b* are each disposed close to the intermediate transfer belt 21 so as to irradiate the outer circumferential surface of the intermediate transfer belt 21 with light of a defined wavelength.

Meanwhile, a sheet is fed from any of the sheet feed cassettes of the sheet feeder 13 in coordination with the imaging operation of the imaging units 20Y, 20M, 20C, 20K.

The sheet is conveyed on a conveyance path to a secondary transfer position where the secondary transfer roller 22 and the backup roller face each other across the intermediate transfer belt 21. At the secondary transfer position, electrostatic charge of the secondary transfer roller 22 causes the Y, M, C, K color toner image on the intermediate transfer belt 21 to be transferred to the sheet. The sheet onto which the Y, M, C, K color toner image has been transferred is further conveyed to the fixing unit 50.

When the toner image on the surface of the sheet passes through a fixing nip formed between a heating roller 51 of the fixing unit 50 and a pressure roller 52 of the fixing unit 50 pressed against the heating roller 51, heat and pressure causes the toner image to be fused and fixed to the surface of the sheet. After passing through the fixing unit 50, the sheet is sent to a discharge tray 15.

The operation panel 19 is provided with a display composed of a liquid crystal display board or the like, which displays content set by a user, various messages, and the like. The operation panel 19 receives from a user an instruction to start copying, a setting of the number of copies, a setting of copying conditions, a setting of data output destination, and the like, and notifies the control circuitry 100 of received content.

1.2. Control Circuitry 100

As illustrated in FIG. 2A, the control circuitry 100 includes a central processing unit (CPU) 151, read only memory (ROM) 152, random access memory (RAM) 153, image memory 154, image processing circuitry 155, network communication circuitry 156, scanner control circuitry 157, input/output circuitry 158, printer control circuitry 159, a bus 166, and the like.

The CPU 151, the ROM 152, the RAM 153, the image memory 154, the image processing circuitry 155, the network communication circuitry 156, the scanner control circuitry 157, the input/output circuitry 158, and the printer control circuitry 159 are connected to each other via the bus 166.

The RAM 153 temporarily stores various control variables and data such as number of copies set via the operation panel 19, and also provides a work area when a program is executed by the CPU 151.

The ROM 152 stores a control program or the like for executing various jobs such as a copy operation.

The CPU 151 operates according to the control program stored in the ROM 152. When the CPU 151 operates according to the control program, the CPU 151, the ROM 152, and the RAM 153 constitute the main control unit 141. The main control unit 141 unifies control of the image memory 154, the image processing circuitry 155, the network communication circuitry 156, the scanner control circuitry 157, the input/output circuitry 158, the printer control circuitry 159, and the like.

The image memory 154 temporarily stores image data included in a print job or the like.

The image processing circuitry 155 executes data processing on R, G, B color component image data obtained by the image reader 11, for example, and converts the image data to Y, M, C, K reproduction color image data.

The network communication circuitry 156 receives a print job from an external terminal device via a network. Further, the network communication circuitry 156 transmits data to an external terminal device via a network.

The scanner control circuitry 157 controls the image reader 11 to execute a document scanning operation.

The input/output circuitry 158 receives an input signal from the operation panel 19 and outputs the received input signal to the main control unit 141. Further, the input/output circuitry 158 receives a display image from the main control unit 141 and outputs the received display image to the operation panel 19 to be displayed.

The printer control circuitry 159 controls the printer 12 to execute an image forming operation. A detailed description of the printer control circuitry 159 follows.

1.3. Printer Control Circuitry 159

As illustrated in FIG. 2A, the printer control circuitry 159 includes the CPU 142, the ROM 143, the RAM 144, storage circuitry 149, and the like.

The RAM 144 temporarily stores various control variables, data, and the like, and provides a work area for program execution by the CPU 142.

The ROM 143 stores a control program or the like for executing various jobs such as a print job.

The CPU 142 operates according to the control program stored in the ROM 143. When the CPU 142 operates according to the control program, the CPU 142, the ROM 143, and the RAM 144 constitute a printer control unit 145.

The storage circuitry 149 is composed of semiconductor memory, for example. As described later, the storage circuitry 149 has an area for storing a plurality of sets of fogging margin and output values from the sensor 26.

(1) Printer Control Unit 145

As illustrated in FIG. 2A, by operation of the CPU 142 according to a control program, the printer control unit 145 comprises an integrated control unit 146, a drive control unit 147, and a margin control unit 148.

The printer control unit 145 controls the printer 12 to execute a print job, and also to execute a process determining a fogging margin, described below. The following description primarily describes forming of a fogging image.

(a) Integrated Control Unit 146

When forming a fogging image, the integrated control unit 146 controls operation of the printer 12 and also unifies control of the drive control unit 147 and the margin control unit 148.

Further, the integrated control unit 146 control a process of determining a fogging margin to be executed, for example, in a period after power of the image forming device 5 is turned on, before a first print job is executed.

(b) Drive Control Unit 147

For each of the Y, M, C, K imaging units, the drive control unit 147 (driver) controls DC charge output voltage of the DC power supply circuitry 41 to apply as charge bias to the charge device 24. Here, the DC charge output voltage changes according to value of a variable M (fogging margin) output from the margin control unit 148.

Further, for each of the Y, M, C, K imaging units, the drive control unit 147 controls DC developer output voltage of the DC power supply circuitry 42 to apply as developer bias to the developer roller 25*a* of the developer device 25. Here, the DC developer output voltage changes according to value of the variable M output from the margin control unit 148.

Note that the drive control unit 147 may control developer bias to be applied to the developer device 25 as a DC voltage superimposed with an AC voltage. In this case, for each of the Y, M, C, K imaging units and under control of the integrated control unit 146, the drive control unit 147 controls the AC power supply circuitry 43 to also apply AC voltage to the developer roller 25*a* of the developer device 25 at the same time as output of the DC power supply circuitry 42.

(c) Margin Control Unit 148

Loop Control

A voltage difference between charge bias and developer bias is here referred to as the fogging margin (V).

The margin control unit 148 has the variable M for storing the fogging margin, which is changed in steps.

As described later, the margin control unit 148 (controller) first, for example, sets the fogging margin to 160 V, substitutes 160 for the variable M, and executes a control such that a fogging image is formed on the surface of the photoreceptor drum 23 corresponding to one color, with the variable M as a fogging margin condition. Subsequently, the margin control unit 148 controls the sensor 26 to scan the fogging image formed on the surface of the photoconductor drum 23. The margin control unit 148 acquires an output value from the sensor 26, associates the fogging margin with the output value acquired, and writes to the storage circuitry 149.

Subsequently, the margin control unit 148 reduces the fogging margin 10 V at a time, for example. That is, the margin control unit 148 subtracts 10 from the variable M, executes a control such that a fogging image is formed on the surface of the photoconductor drum 23 with the variable M as the fogging margin condition, as described above, and the sensor 26 scans the fogging image formed on the surface of the photoconductor drum 23. The margin control unit 148 acquires an output value from the sensor 26, associates the fogging margin with the output value acquired, and writes to the storage circuitry 149.

The margin control unit 148 executes the control such that the above fogging image formation, fogging image scanning, and writing to the storage circuitry 149 is looped until the fogging margin variable M reaches 40 V, for example.

In this way, in fogging image formation, the margin control unit 148 executes the control such that fogging image formation, fogging image scanning, and writing to the storage circuitry 149 is repeated n times while changing the fogging margin in steps.

As a result, a total of n sets of the fogging margins and the output values from the sensor 26 are stored in the storage circuitry 149.

The margin control unit 148 can adopt either one of the following two cases when executing the loop control described above. Which case is adopted is predetermined.

In each case, each output voltage is set so that the fogging margin is changed in steps of 10 V, for example.

(Case a) The margin control unit 148 executes the control such that the developer bias is kept constant while the charge bias is changed by changing the variable M in steps of 10 V.

(Case b) The margin control unit 148 executes the control such that the charge bias is kept constant while the developer bias is changed by changing the variable M in steps of 10 V.

Figure 3:
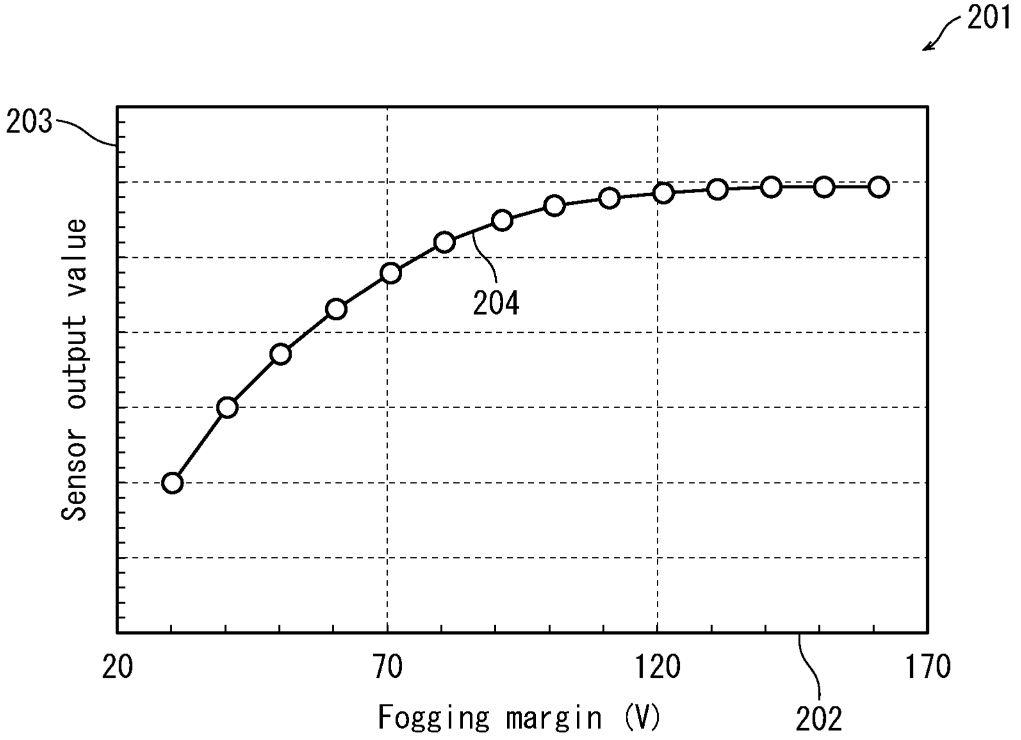
FIG. 3 is a graph 201 illustrating transitions between output values of a sensor 26.

FIG. 3 illustrates a graph showing transitions between output values of the sensor 26 for each fogging margin step of 10 V written to the storage circuitry 149 by the margin control unit 148, as described above.

In FIG. 3, the horizontal axis indicates the fogging margin (V) and the vertical axis indicates the output values of the sensor 26. A curved line 204 indicates transitions between the output values of the sensor 26.

The output values of the sensor 26 show differences in output values from a case in which there is no shield (that is, no fogging toner) on the surface of the photoconductor drum 23.

When there is no shield on the surface of the photoconductor drum 23, the sensor 26 outputs a value slightly smaller than an upper limit of output from the sensor 26. When an amount of shielding on the surface of the photoconductor drum 23 increases, the output value of the sensor 26 decreases. Here, the output value of the sensor 26 decreases between light emitted to the surface of the photoconductor drum 23 by the reflection type sensor 26 is diffusely reflected by the shield, and the greater the shielding, the less light is detected by the sensor 26.

Figure 4A:
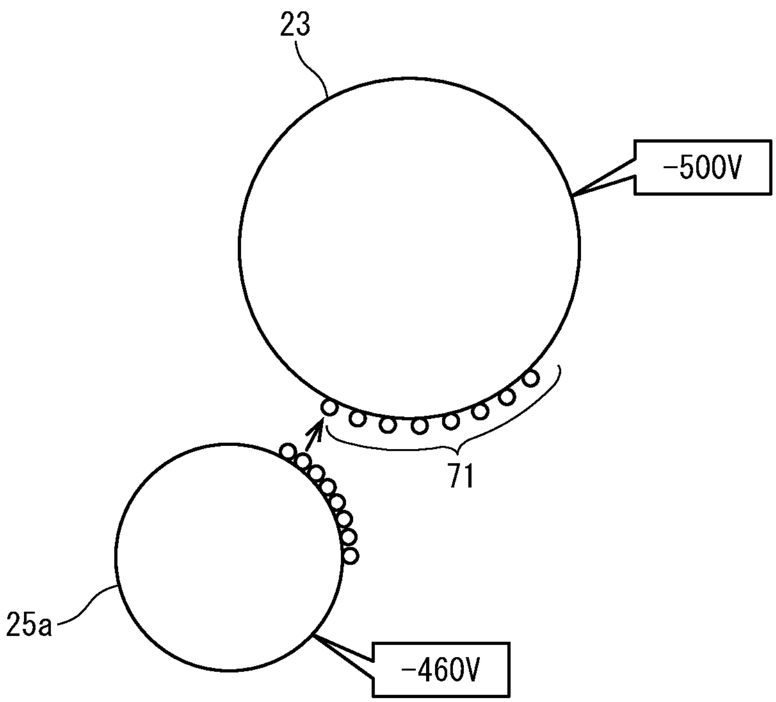
FIG. 4A illustrates a fogging image 71 adhering to a surface of a photoconductor drum 23 when a fogging margin is small.

This phenomenon is described with reference to FIGS. 4A and 4B. In FIG. 4A, as an example, the fogging margin is set to "40 V", where the potential on the surface of the photoconductor drum 23 due to the charge bias is set to "−500 V", and the potential on the surface of the developer roller 25*a* due to the developer bias is set to a 50% duty AC voltage superimposed on a "−460 V" DC voltage, and a fogging image 71 adheres onto the surface of the photoconductor drum 23. On the other hand, in FIG. 4B, as an example, the fogging margin is set to "160 V", where the potential on the surface of the photoconductor drum 23 is set to "−500 V", and the DC voltage to the developer roller 25*a* is changed to "−340 V", and a fogging image 72 adheres onto the surface of the photoconductor drum 23.

Figure 4B:
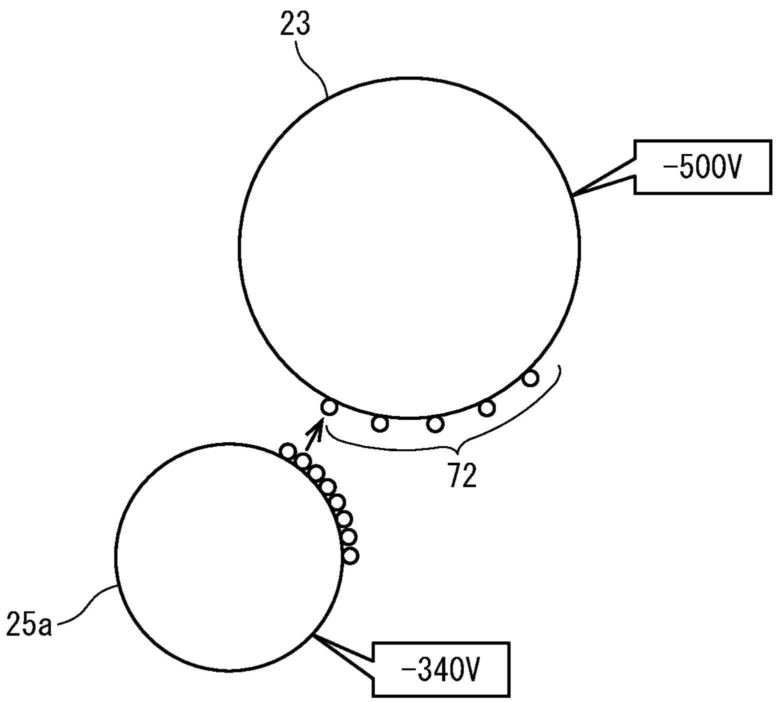
FIG. 4B illustrates a fogging image 72 adhering to the surface of the photoconductor drum 23 when a fogging margin is large.

In the case of FIG. 4A, the fogging margin, which is the difference between the potential on the surface of the photoconductor drum 23 and the potential on the surface of the developer roller 25*a*, is smaller than in the case of FIG. 4B, and therefore negative polarity charged toner is more likely to jump from the developer roller 25*a* to the surface of the photoconductor drum 23 than in the case of FIG. 4B.

Accordingly, an amount of toner in the fogging image 71 adhering to the surface of the photoconductor drum 23 illustrated in FIG. 4A is larger than an amount of toner in the fogging image 72 adhering to the surface of the photoconductor drum 23 illustrated in FIG. 4B.

Conversely, an amount of toner recovered from the surface of the photoconductor drum 23 illustrated in FIG. 4A by the developer roller 25*a* can be said to be less than an amount of toner recovered from the surface of the photoconductor drum illustrated in FIG. 4B by the developer roller 25*a*.

According to FIG. 3, when the fogging margin is small, the output value of the sensor 26 is small and the amount of fogging toner is large. As the fogging margin increases (30 V to 120 V), the output value of the sensor 26 also increases, the amount of fogging toner decreases, and when the fogging margin reaches a certain point (120 V or more), the output value of the sensor 26 becomes substantially constant and is saturated.

Calculation of Amount of Change

The margin control unit 148 (calculation unit) reads n sets of fogging margin and output value from the sensor 26 from the storage circuitry 149. The margin control unit 148 calculates an amount of change in the output values from the sensor 26 by using the n sets of the fogging margin and output value from the sensor 26, as described below.

If a given fogging margin is M1, an output value obtained at that time is V1, and the fogging margin is reduced in increments of 10 V, the fogging margin adjacent to the fogging margin M1 is M2 and an output value obtained at that time is V2, then the margin control unit 148 calculates an amount of change ΔV for each increment of 10 V according to the following formula.

$$\text{Amount of change } \Delta V_{M2}=(V1-V2)/(M1-M2)$$

Here, the fogging margin M2 is the next step fogging margin from the fogging margin M1.

Similarly, when a next adjacent fogging margin is M3 and the obtained output value is V3, the margin control unit 148 calculates the amount of change ΔV according to the following formula.

$$\text{Amount of change } \Delta V_{M3}=(V2-V3)/(M2-M3)$$

Here, the fogging margin M3 is the next step fogging margin from the fogging margin M2.

The margin control unit 148 repeats the above procedure while reducing the fogging margin.

The margin control unit 148 writes in the storage circuitry 149 each set of fogging margin and amount of change calculated for that fogging margin.

Figure 5:
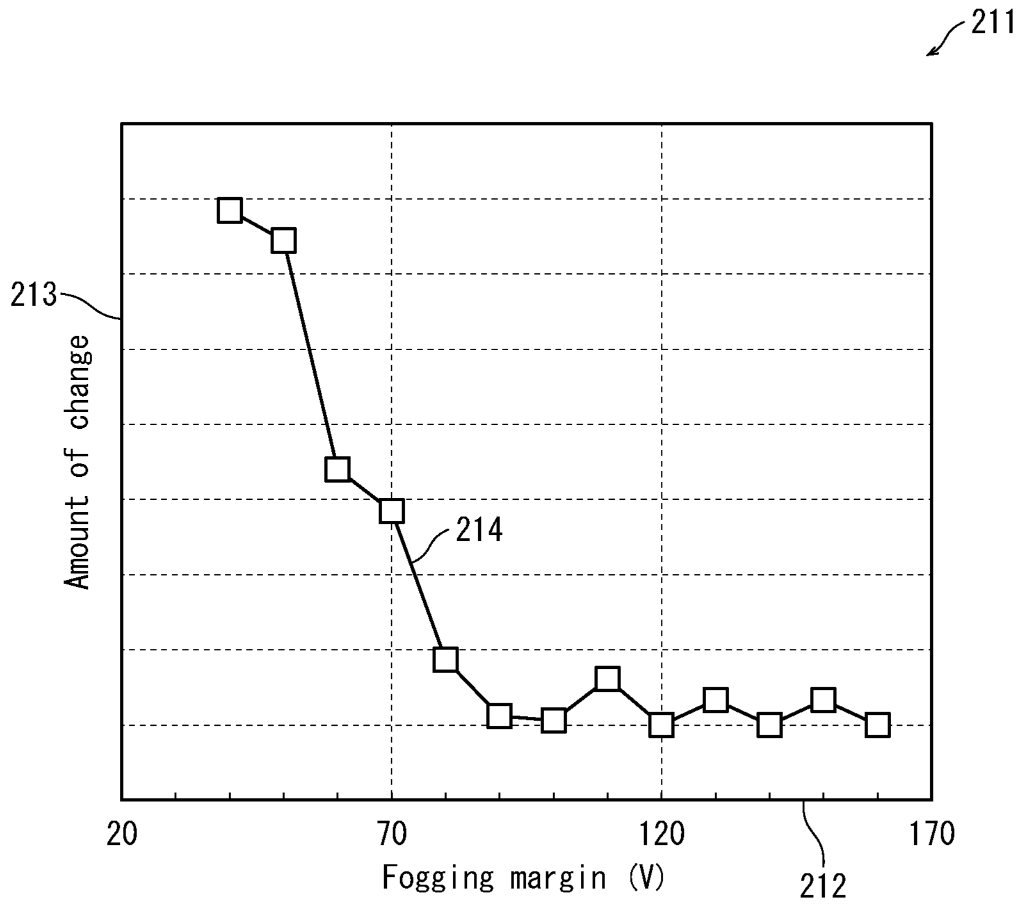
FIG. 5 is a graph 211 illustrating transitions between amounts of change in output value of the sensor 26.

In this way, FIG. 5 illustrates a graph 211 showing transitions between amounts of change for each fogging margin written to the storage circuitry 149 by the margin control unit 148, in increments of 10 V.

In FIG. 5, the horizontal axis indicates the fogging margin (V) and the vertical axis indicates the output values of the sensor 26. A curved line 214 indicates transitions between amounts of change.

From FIG. 5, it can be seen that when the fogging margin is from 40 V to 80 V, the amount of change gradually decreases as the fogging margin increases. In contrast, after the fogging margin 90 V, changes in amounts of change are small and almost saturated.

Amounts of change being saturated here means that amounts of fogging toner are difficult to change, or changes are difficult to detect by the sensor 26, which is an optical sensor, and therefore the margin control unit 148 (determination unit) obtains the fogging margin corresponding to a point where the amounts of change begin to saturate, determines that this fogging margin is an appropriate fogging margin, and writes this fogging margin to the storage circuitry 149.

Fogging Margin Determination

The margin control unit 148 (determination unit) calculates an amount of change in amounts of change as follows.

Note that in the following, calculations are performed according to an ordering in which the fogging margin changes from a smaller value to a larger value.

The margin control unit 148 has a variable i.

The margin control unit 148 calculates an amount of change δ(1) in amount of change ΔV(1), amount of change ΔV(2), and amount of change ΔV(3).

Amount of change δ(1)=(amount of change ΔV(1)−amount of change ΔV(3))/40

Here, the amount of change ΔV(1) is the amount of change at the fogging margin 40 V, the amount of change ΔV(2) is the amount of change at the fogging margin 60 V, the amount of change ΔV(3) is the amount of change at the fogging margin 80 C, and a denominator "40" is the difference between the fogging margin 80 V and the fogging margin 40 V.

Here, the fogging margin 80 V is the fogging margin at a step following the fogging margin 40 V.

The margin control unit 148 writes "1" and the amount of change δ(1) to the storage circuitry 149.

Next, the margin control unit 148 calculates an amount of change δ(2) in amount of change ΔV(2), amount of change ΔV(3), and amount of change ΔV(4).

Amount of change δ(2)=(amount of change ΔV(2)−amount of change ΔV(4))/40

Here, the amount of change ΔV(4) is the amount of change at the fogging margin 100 V, and the denominator "40" is the difference between the fogging margin 100 V and the fogging margin 60 V.

Further, the fogging margin 100 V is the fogging margin at a step following the fogging margin 60 V.

The margin control unit 148 writes "2" and the amount of change δ(2) to the storage circuitry 149.

Next, the margin control unit 148 calculates an amount of change δ(3) in amount of change ΔV(3), amount of change ΔV(4), and amount of change ΔV(5).

Amount of change δ(3)=(amount of change ΔV(3)−amount of change ΔV(5))/40

Here, the amount of change ΔV(5) is the amount of change at the fogging margin 120 V, and the denominator "40" is the difference between the fogging margin 120 V and the fogging margin 80 V.

The margin control unit 148 writes "3" and the amount of change δ(3) to the storage circuitry 149.

Next, as above, the margin control unit 148, for values of variable i greater than 3, calculates an amount of change δ(i) for an amount of change ΔV(i), an amount of change ΔV(i+1), and an amount of change ΔV(i+2), and writes the variable i and the amount of change δ(i) to the storage circuitry 149.

Note that the margin control unit 148 may calculate an amount of change δ(i) between an amount of change ΔV(i) and an amount of change ΔV(i+1). Further, the margin control unit 148 may calculate an amount of change δ(i) between an amount of change ΔV(i) and an amount of change ΔV(i+3).

Comparison Between Defined Value and Difference Between Amount of Change δ(i) and Amount of Change δ(i+1)

The margin control unit 148 compares a defined value to a difference between amount of change δ(1) and amount of change δ(2). When the difference between the amount of change δ(1) and the amount of change δ(2) is equal to or greater than the defined value, the margin control unit 148 then compares the defined value to a difference between the amount of change δ(2) and the amount of change δ(3). Next, when the difference between the amount of change δ(2) and the amount of change δ(3) is equal to or greater than the defined value, the margin control unit 148 then executes a next comparison following the same pattern.

Here, when the difference between the amount of change δ(2) and the amount of change δ(3) is less than the defined value, the margin control unit 148 stores a suffix (variable) of "2" in association with the amount of change δ(2).

In this way, the margin control unit 148 compares the defined value to a difference between two values of the amount of change δ, two by two from a largest value of the amount change δ. When a difference between two amounts of change δ is equal to or greater than the defined value, a difference between the following two amounts of change δ is compared with the defined value. When a difference between two amounts of change δ is equal to or greater than the defined value, a difference between the following two amounts of change δ is compared with the defined value. When a difference between two amounts of change δ is less than the defined value, a suffix of the value of the first of the two amounts of change δ is stored.

The suffix stored in this way is a point at which amounts of change begin to saturate when the amounts of change $\Delta V_{M2}$, $\Delta V_{M3}$, . . . $\Delta V_{Mn+1}$ are calculated by changing the fogging margin.

As described above, the margin control unit 148 determines for each step whether or not a difference in amounts of change is equal to or greater than the defined value, and extracts a boundary between a range of fogging margins for which differences in amounts of change are equal to or more than the defined value and a range of fogging margins for which differences in amounts of change are less than the defined value and determines that the fogging margin at the boundary is an appropriate fogging margin. That is, when the margin control unit 148 changes the fogging margin and calculates the amounts of change $\Delta V_{M2}$, $\Delta V_{M3}$, . . . $\Delta V_{Mn+1}$, a point at which the amounts of change start to saturate is determined to be an appropriate fogging margin.

The fogging margin determined in this way is stored, and when image forming is next performed in order to execute printing, the fogging margin is read out, and the charge bias and the developer bias are set according to the fogging margin read out.

When an optical sensor having the same sensitivity is used, the fogging amount of the fogging margin determined in this way has been confirmed as almost constant even when concentration of developer is high, low, or variable, with an allowable range, as described below.

Examples of Changes in Toner Concentration

Figure 8:
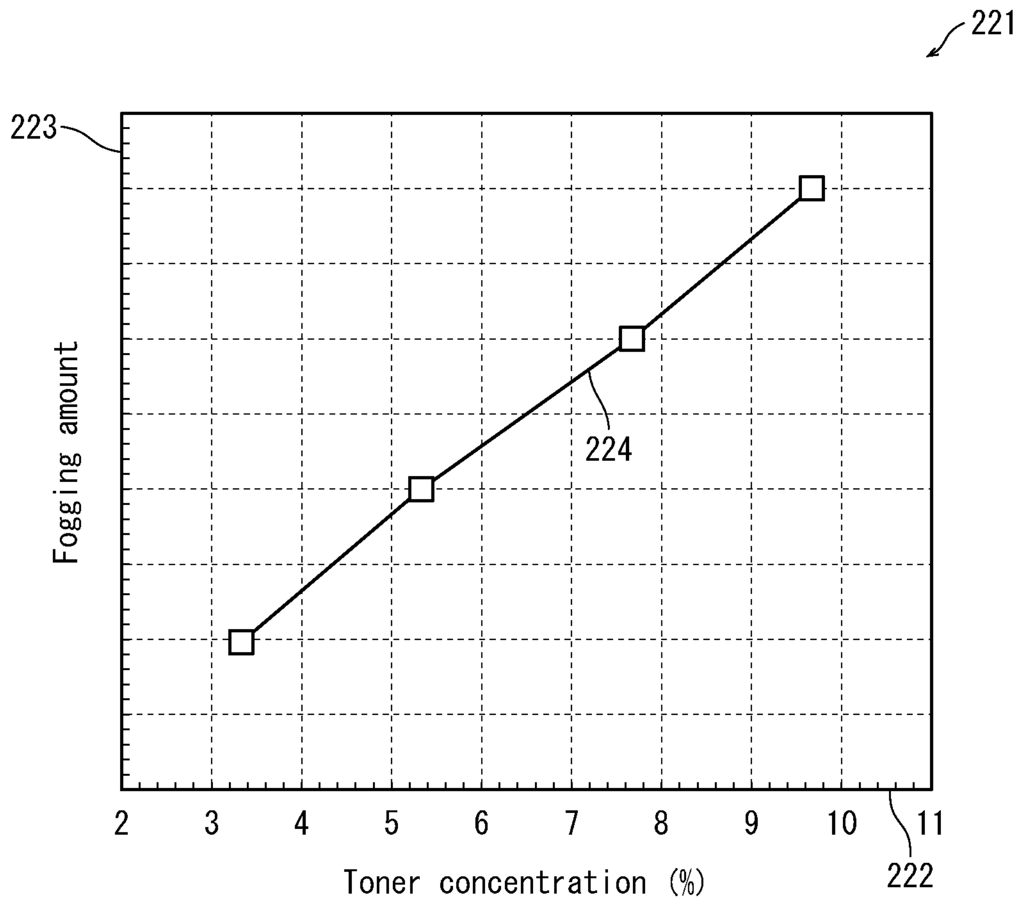
FIG. 8 illustrates a graph 221 showing a relationship between toner concentration and fogging amount.

FIG. 8 illustrates a graph 221 showing a relationship between developer toner concentration and a fogging amount of toner on the photoconductor.

Here, the toner concentration is calculated as (toner amount)/(toner amount+carrier amount).

The horizontal axis of FIG. 8 indicates developer toner concentration (%), and the vertical axis indicates a fogging amount of toner in a fogging image. A graph 224 plots and indicates fogging amounts of fogging images obtained by measurement for each toner concentration, according to four different toner concentrations.

Here, an amount of toner in a fogging image is an amount of toner recovered by the blade 27*a* of the cleaner 27 from fogging toner on the photoconductor for each toner concentration, when the fogging margin is maintained at a certain value.

When developer toner concentration is high, the fogging amount increases because an absolute amount of toner released from the developer device 25 to the photoconductor drum 23 increases in a fogging image. On the other hand, when toner concentration is low, an absolute amount of toner released as a fogging image is small, and therefore the fogging amount decreases.

Note that this fogging amount is correlated with fogging amount of fogging toner on paper (that is, toner adhering to a white background image), so that when the fogging amount increases, the fogging amount on paper increases, and this correlation is known to be a one-to-one relationship.

Figure 9:
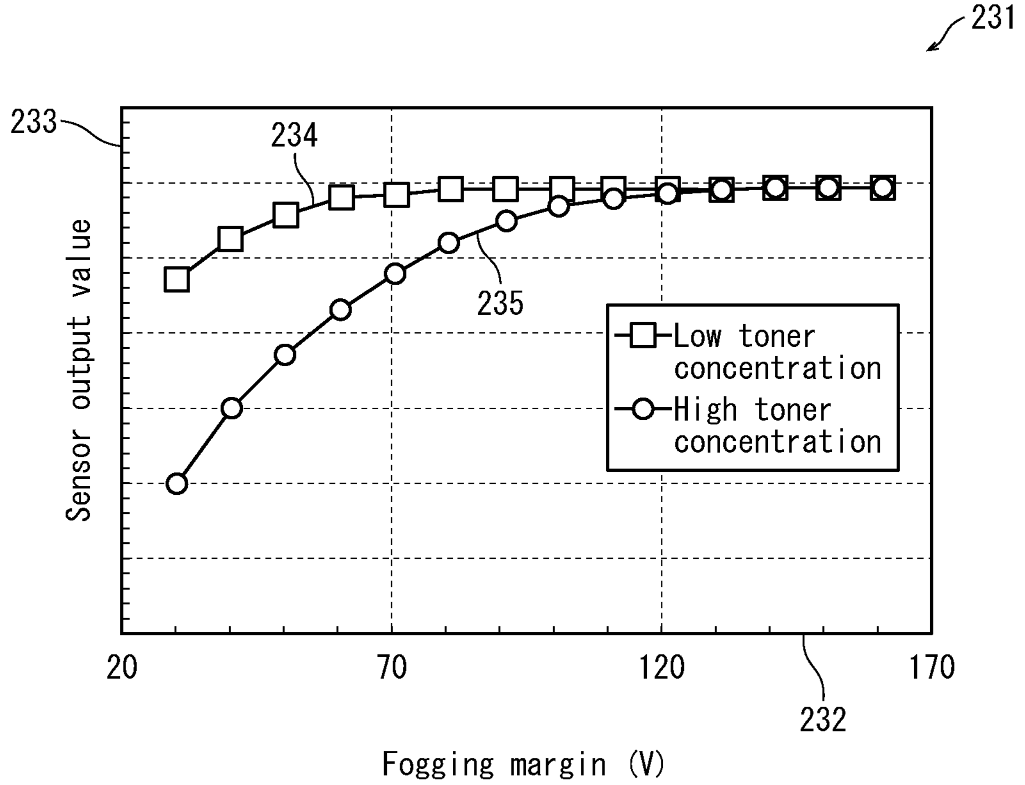
FIG. 9 is a graph 231 showing transitions between output values of the sensor 26 for two types of toner concentration.

FIG. 9 illustrates a graph 231 showing transitions of output values from the sensor 26 when two types of toner concentration are detected on the surface of the photoconductor drum 23, among the toner concentrations illustrated in FIG. 8.

Developer toner concentration is normally controlled so as to alternate between high and low within an acceptable range of an upper limit and lower limit from a target value. FIG. 9 illustrates output values of the sensor 26 with respect to fogging margins at high toner concentration and low toner concentration within the acceptable range.

In FIG. 9, the horizontal axis indicates the fogging margin (V) and the vertical axis indicates the output values of the sensor 26. A curve 234 indicates transitions of output values of the sensor 26 with respect to fogging margins when toner concentration is low, and a curve 235 indicates transitions of output values of the sensor 26 with respect to fogging margins when toner concentration is high.

When the fogging margin is high on both the curve 234 and the curve 235, then, for example, when the fogging margin is higher than 150 V, output values of the sensor 26 converge on an upper limit of output values of the sensor 26, regardless of the toner concentration.

On the other hand, when the fogging margin is low, for example when the fogging margin is in a range of 30 V to 100 V, the curve 235 of high toner concentration is associated with a smaller output value of the sensor 26 than the curve 234 of low toner concentration, when comparing the same fogging margin values.

That is, as is clear from the relationship between toner concentration and fogging amount measured in FIG. 8, the fogging amount of a fogging image has some influence on output value of the sensor 26 with respect to fogging margins, as shown in FIG. 9.

Figure 10:
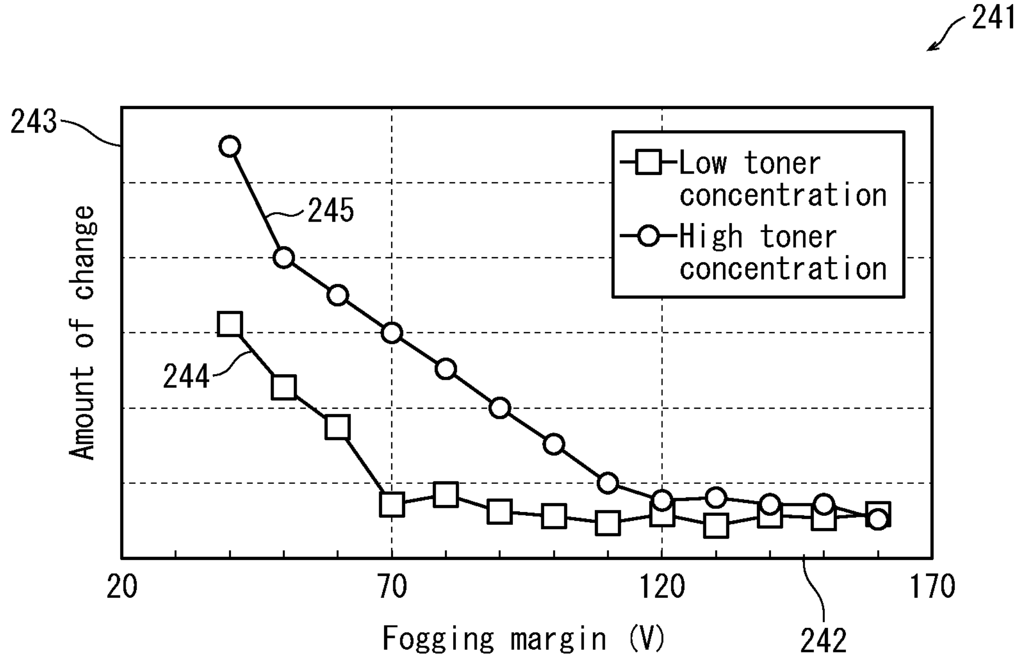
FIG. 10 is a graph 241 showing transitions between amounts of change in output value of the sensor 26 for two types of toner concentration.

FIG. 10 illustrates a graph 241 showing relationships between calculated fogging margin and transitions of amounts of change, applying a method of obtaining amounts of change described above as Embodiment 1, using the transitions of output values of the sensor 26 and fogging margins illustrated in FIG. 9.

In FIG. 10, the horizontal axis indicates the fogging margin (V) and the vertical axis indicates the output values of the sensor 26. A curve 244 indicates transitions in amounts of change when toner concentration is low, and a curve 245 indicates transitions in amounts of change when toner concentration is high.

As illustrated in FIG. 10, when toner density is high (the curve 245), a degree of change in amounts of change from small to large fogging margins is greater than a degree of change in amounts of change when toner density is low (the curve 244).

On the other hand, a point at which amounts of change saturate differs between the curve 244 and the curve 245. For the curve 245 when toner concentration is high, amounts of change saturate approximately at the fogging margin 120 V, and for the curve 244 when toner concentration is low, amounts of change saturate approximately at the fogging margin 70 V.

Review

Values of saturated amounts of change are almost the same regardless of whether developer toner concentration is low or high. It can also be said that amounts of change are an index of fogging toner fogging amounts.

Accordingly, when the fogging margin is determined by the control described above, the fogging toner amount on the photoconductor is the same regardless of developer toner concentration, and stable fogging toner can be formed.

According to the configuration described above, in an electrophotographic image forming device, the fogging margin that influences fogging toner amount is appropriately determined so that fogging amounts can be stabilized, which is an outstanding effect.

Although not described in detail here, the same results apply to, for example, changes in developer toner charge amounts, changes in developer device developer amounts (conveyance amount), changes in distance between the developer device and the photoconductor drum, and the like.

The researcher of the present disclosure found that even if conditions such as toner concentration and charge amounts change, the relationship between fogging margin and amounts of change is represented by a curve like an exponential function, as illustrated in FIG. 5 and FIG. 10. By determining the fogging margin according to the above control, fogging amount of fogging toner can be stabilized even if changes occur in states of the photoconductor drum, the intermediate transfer belt, each unit of the above, and the like.

It is also possible to add an offset, such as +10 V or +15 V to the fogging margin determined by the above control, depending on conditions such as toner color used, processing state, wear to processing devices, and the like.

Depending on device structure, use of a certain offset to the determined fogging margin may make it possible to improve both suppression of toner consumption used for forming fogging toner and suppression of wear on the blade. An experiment may be performed in advance to determine an offset amount, and the amount obtained by adding the offset amount to the determined fogging margin may be used as a fogging margin suitable for a given device.

Figure 6:
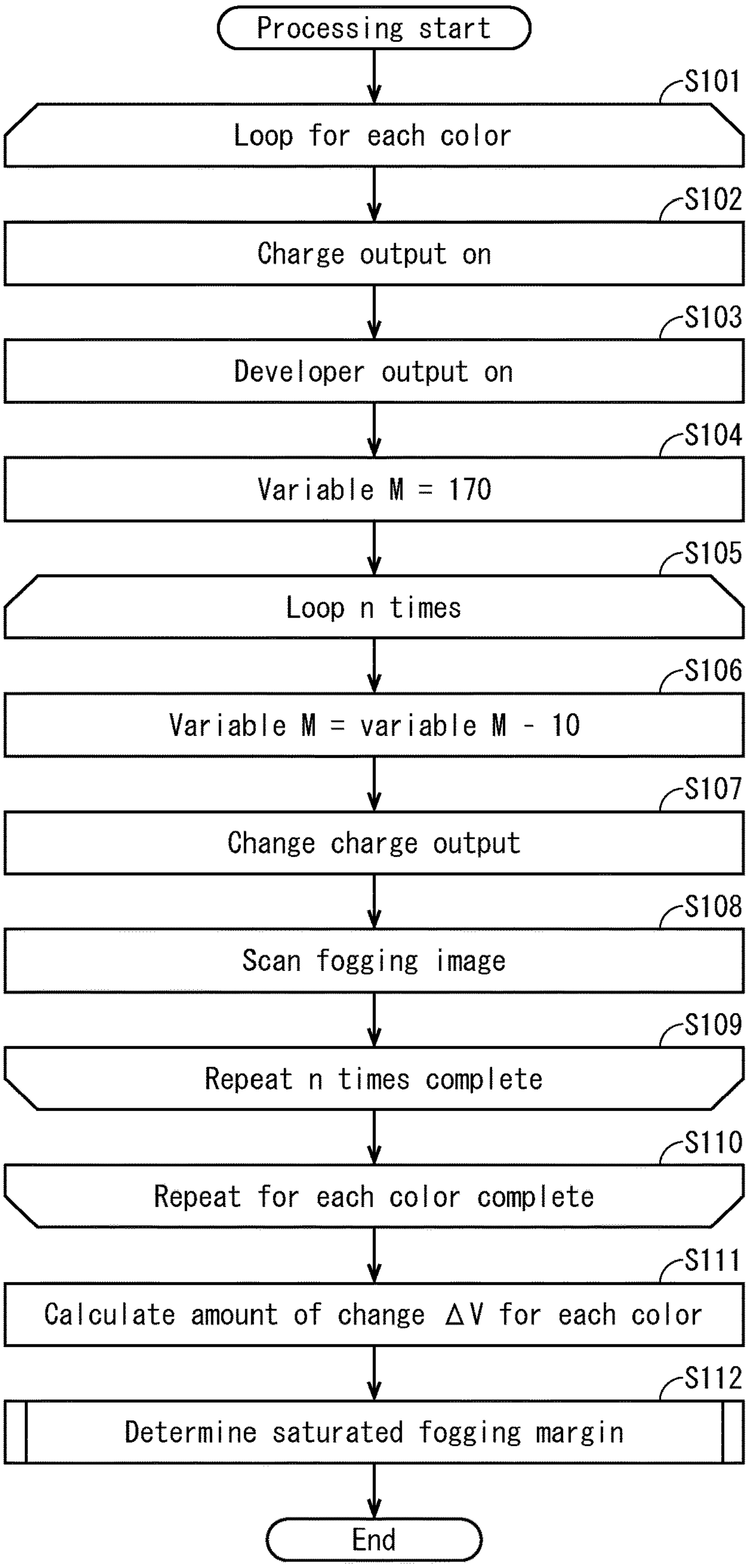
FIG. 6 is a flowchart illustrating operations for determining an appropriate fogging margin.

1.4. Operation to Determine Appropriate Fogging Margin (1) An operation to determine an appropriate fogging margin in the image forming device 5 is described below with reference to the flowchart illustrated in FIG. 6. As described above, in this operation, each color of imaging unit does not form a toner image, and instead forms a fogging image. Further, the operation described here is based on the example of case a, described above.

The integrated control unit 146 executes a control to repeat a loop from step S102 to step S109 for each of Y, M, C, K colors (steps S101 to S110).

Under control of the margin control unit 148, the drive control unit 147 sets charge output of the charge device 24 corresponding to the color to "ON", and drives the charge device 24 by application of a defined charge output voltage (step S102).

Next, under control of the margin control unit 148, the drive control unit 147 sets developer output of the developer device 25 corresponding to the color to "ON", and drives the developer roller 25*a* of the developer device 25 by application of a defined developer output voltage to the developer roller 25*a* of the developer device 25 (step S103).

Next, the margin control unit 148 sets the variable M to an initial value "170" (step S104).

The margin control unit 148 executes a control to repeat a loop from step S106 to step S108 n times (steps S105 to S109).

The margin control unit 148 sets a value obtained by subtracting "10" from the variable M as the variable M (step S106).

Next, under control of the margin control unit 148, the drive control unit 147 calculates the charge output voltage by subtracting the value of the variable M from the current charge output voltage of the charge device 24 corresponding to the color, and applies the calculated charge output voltage to the charge device 24 (step S107). In this way, a fogging image is formed on the surface of the photoconductor drum 23 corresponding to the color.

Next, the margin control unit 148 controls the sensor 26 to scan the fogging image formed on the surface of the photoconductor drum 23 corresponding to the color. The sensor 26 scans the fogging image on the surface of the photoconductor drum 23 and obtains an output value (step S108).

When looping n times is complete (step S109), and looping is complete for each of Y, M, C, K colors (step S110), the margin control unit 148 calculates the amount of change ΔV for each color (step S111). Next, the margin control unit 148 determines the value of the saturated fogging margin (step S112).

The above concludes description of an operation for determining an appropriate fogging margin, taking case a described above as an example.

In case b, as described above, in step S107, instead of changing the charge output voltage applied the charge device 24 corresponding to the color, the developer output voltage applied to the developer roller 25*a* of the developer device 25 is changed.

Figure 7:
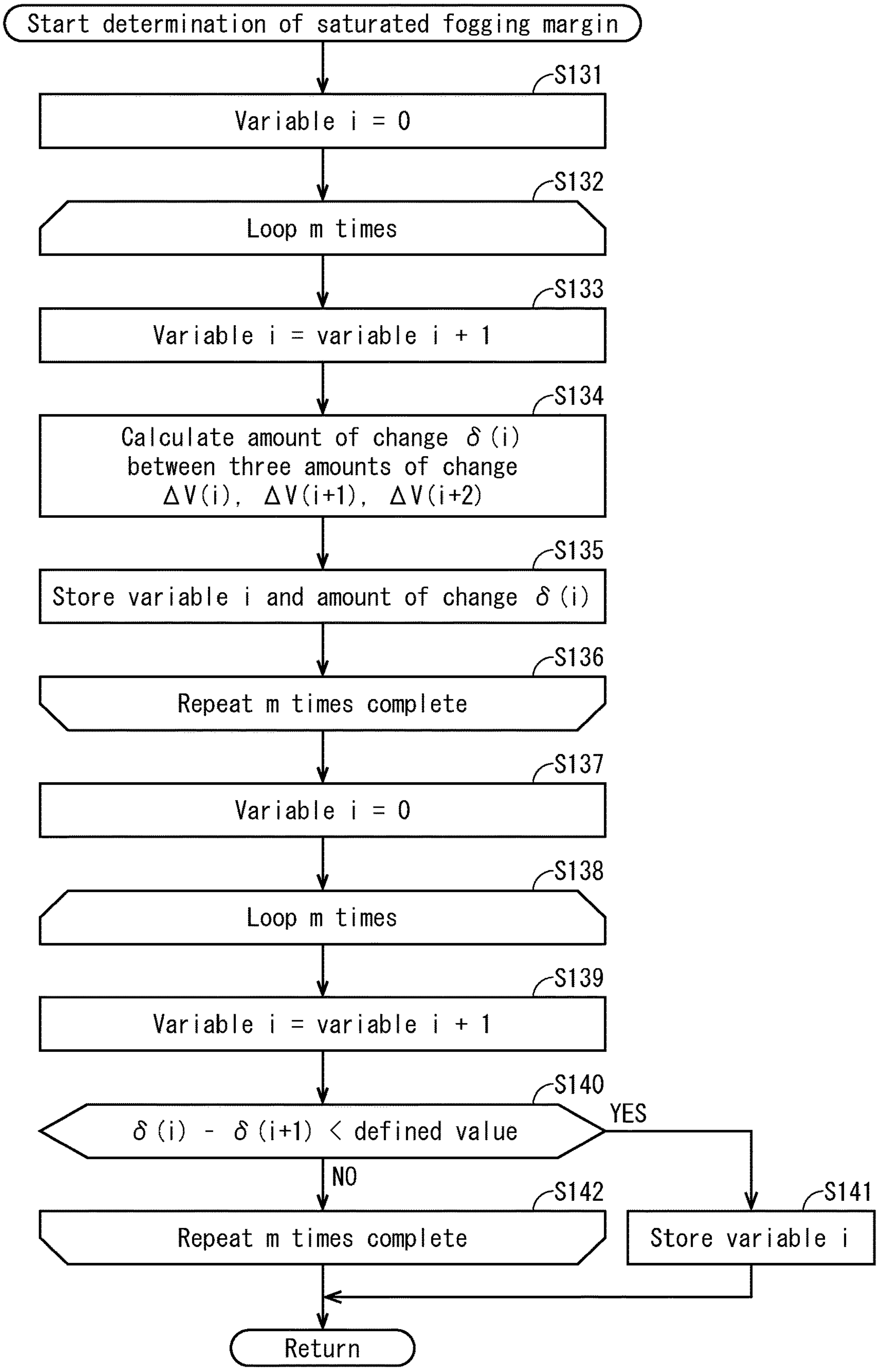
FIG. 7 is a flowchart illustrating operations for determining a value of a saturated fogging margin.

(2) Next, details of an operation for determining a value of a saturated fogging margin in step S112 are described with reference to the flowchart illustrated in FIG. 7.

The margin control unit 148 sets the variable i to an initial value 0 (step S131). Next, the margin control unit 148 repeats a loop from step S133 to step S135, m times (steps S132 to S136).

The margin control unit 148 adds "1" to the variable i (step S133).

Next, the margin control unit 148 calculates an amount of change δ(i) between three amounts of change ΔV(i), ΔV(i+1), ΔV(i+2) (step S134). Next, the variable i and the amount of change δ(i) are stored (step S135).

When the looping of steps S132 to S136 is complete, the margin control unit 148 sets the variable i to the initial value "0" (step S137).

Next, the margin control unit 148 repeats a loop from step S139 to step S141, m times (steps S138 to S142).

The margin control unit 148 adds 1 to the variable i (step S139).

The margin control unit 148 compares a difference (amount of change δ(i)−amount of change δ(i+1)) to a defined value (step S140). When the difference (amount of change δ(i)−amount of change δ(i+1)) is less than the defined value (step S140: "YES"), the margin control unit 148 caused the variable i to be stored (step S141). Here, the stored variable i indicates the value of the determined fogging margin. At this point, the operation determining a value of the saturated fogging margin is complete.

When the difference (amount of change δ(i)−amount of change δ(i+1)) is equal to or greater than the defined value (step S140: "NO"), the margin control unit 148 continues repeating the loop from step S138 to step S142.

The variable i stored in this way is a point at which amounts of change begin to saturate when the amounts of change $\Delta V_{M2}$, $\Delta V_{M3}$, . . . $\Delta V_{M+1}$ are calculated by changing the fogging margin.

1.5. Review

According to Embodiment 1, prior to forming a print image for a print job, the fogging margin, which is a difference between the developer output voltage applied to the developer roller 25*a* of the developer device 25 and the charge output voltage applied to the charge device 24, is changed step by step, and resulting fogging images are scanned by the sensor 26 for each fogging margin. Changes in output values from the sensor 26 are calculated, and for each step, it is determined whether or not a difference in amounts of change is equal to or greater than a defined value is determined. When both a range of fogging margins for which change in amounts of change is equal to or greater than a defined amount and a range of fogging margins for which change in amounts of change is less than the defined amount are determined, the boundary between the two ranges is extracted, and the fogging margin at the boundary is determined to be an appropriate fogging margin.

According to a fogging margin determined in this way, when image forming is executed by applying the developer output voltage to the developer roller 25*a* of the developer device 25 and applying the charge output voltage to the charge device 24, developer containing an appropriate amount of lubricating particles can be applied, in order to suppress wear on the surface of the photoconductor drum and the blade, and consumption of toner used for forming a fogging image can be reduced.

2. Modification 1

The following describes Modification 1 of Embodiment 1.

Modification 1 describes a method for more surely determining a fogging margin than the method described for Embodiment 1.

Fogging is determined by a balance between transfer of toner from the developer device to the photoconductor drum depending on conditions of a developer electric field between surface potential of the photoconductor drum and developer bias, and recovery to the developer device of toner adhering the photoconductor drum.

As described above, fogging toner is different from developer toner that normally adheres to an electrostatic latent image in that an amount of fogging toner is very small and difficult to detect by an optical sensor.

Therefore, according to Embodiment 1, the fogging margin is intentionally set so that fogging is conspicuous by changing the fogging margin in steps, and the optimum fogging margin setting is determined from amounts of change of fogging according to these fogging margins.

On the other hand, in a normal developer electric field, when the fogging margin is decreased, a change in fogging is gradual. For example, even if the fogging margin becomes 0 V, it's possible that fogging may not occur much. For example, if toner concentration is low, fogging is less likely to occur, or if a distance between the developer device and the photoconductor drum is long, fogging is less likely to occur.

In such cases, in order to determine an appropriate fogging margin, it suffices to widen a range in which the fogging margin is changed. However, when a range in which the fogging margin is changed is widened, more time is taken to determine an appropriate fogging margin and such operation causes problems such as increasing a stop time of the image forming device and decreasing operating efficiency.

Here, according to Modification 1, a developer bias condition is changed as a simpler method for increasing fogging.

Specifically, as the developer bias, by changing from normal printing the duty and peak value of a rectangular wave component of a rectangular wave AC bias superimposed on the DC bias, the effect of recovering toner fogging the photoconductor drum is decreased to make the fogging more conspicuous.

Figure 11:
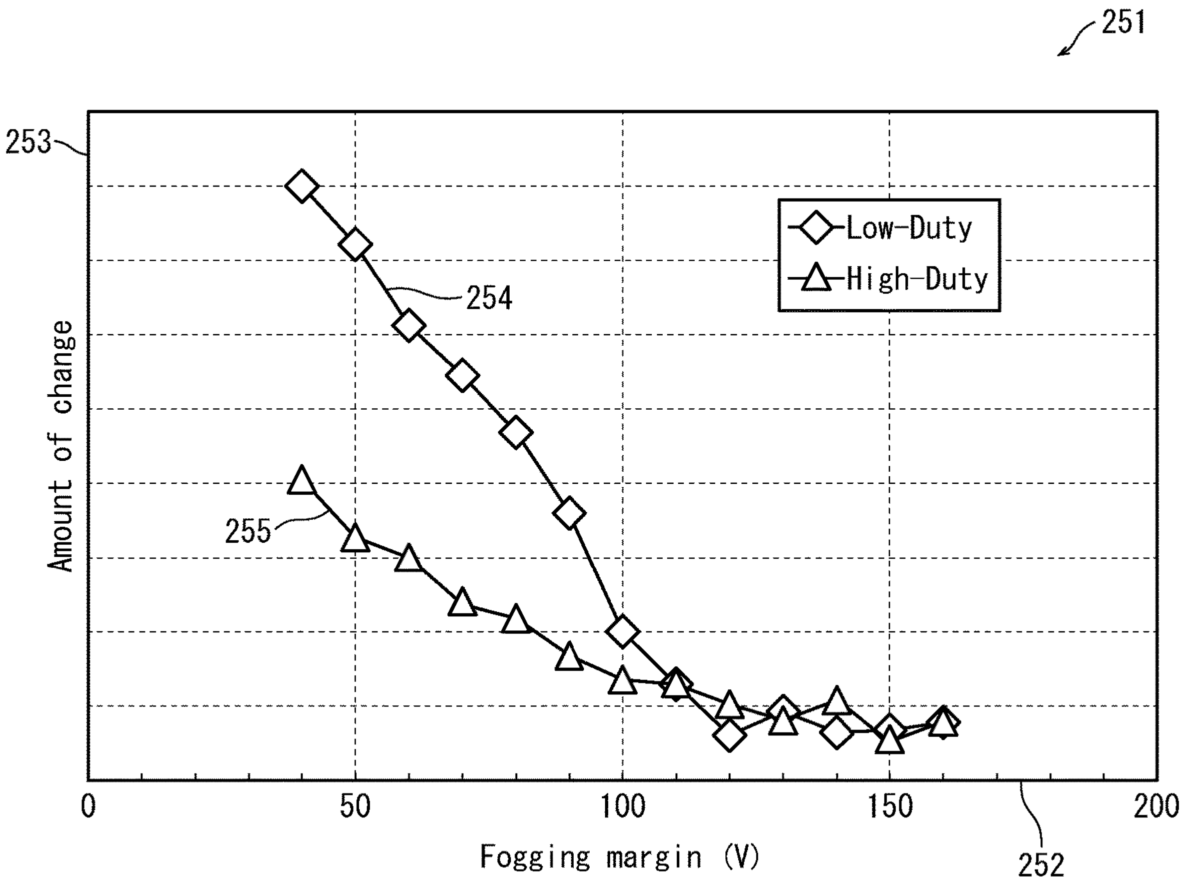
FIG. 11 is a graph 251 showing transitions between amounts of change in output value of the sensor 26 for two types of duty.

FIG. 11 illustrates a graph 251 showing a relationship between fogging margins calculated by applying the method of increasing fogging by weakening the fogging recovery effect via the developer bias, and transitions in amounts of change.

In FIG. 11, the horizontal axis indicates the fogging margin (V) and the vertical axis indicates the output values of the sensor 26. A curve 254 indicates transition in amounts of change for a low-duty example, and a curve 255 indicates transition in amounts of change for a high-duty example.

Here, an AC bias rectangular wave in the high-duty example corresponds to one used in normal printing, and an AC bias rectangular wave in the low-duty example corresponds to one used in fogging margin determination processing.

Figure 12:
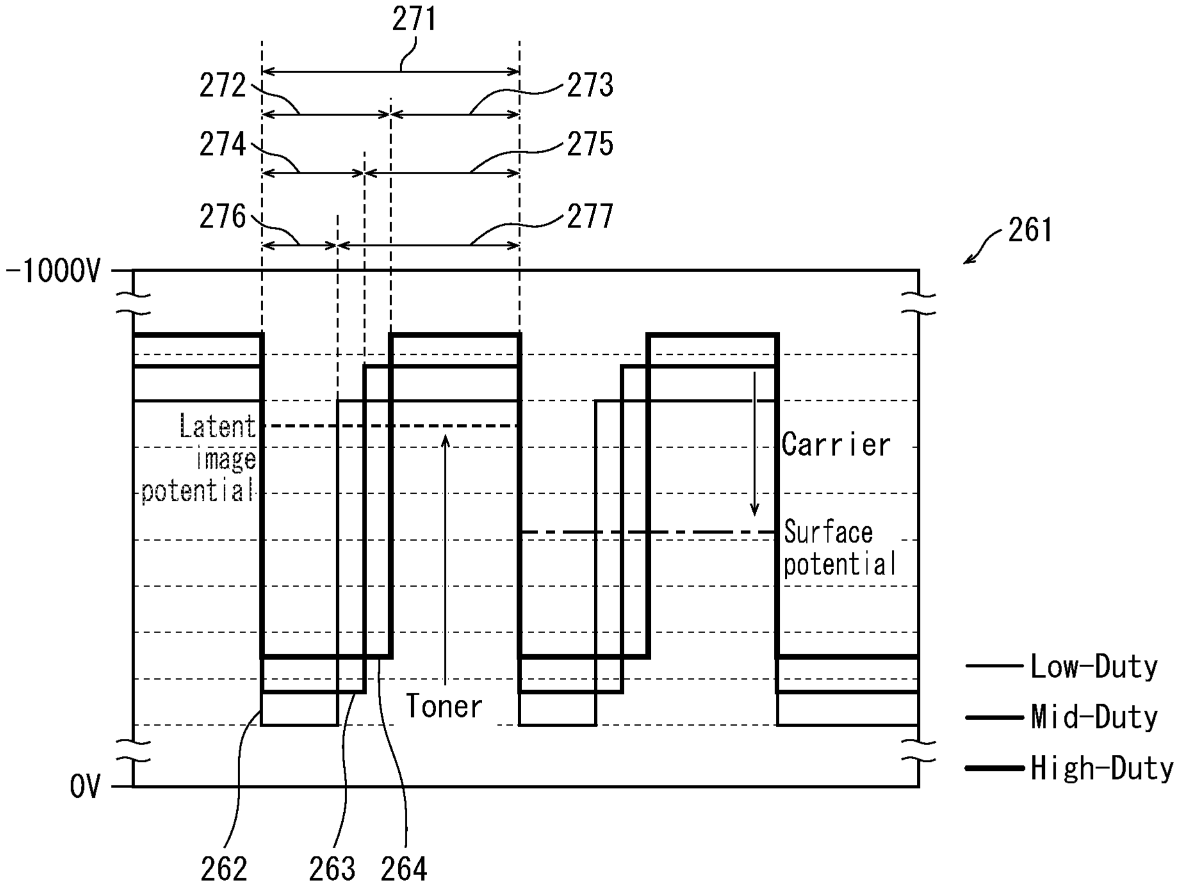
FIG. 12 is a graph 261 showing three types of square waves superimposed on developer bias.

The following describes, as the developer bias, a rectangular wave AC bias superimposed on a DC bias, with reference to FIG. 12.

FIG. 12 illustrates a graph 261 showing changes in developer AC bias of three types of rectangular waves superimposed on a DC developer bias.

In FIG. 12, the horizontal axis indicates passage of time, and the vertical axis indicates potential, where higher on the axis is a lower potential. A line 262 indicates a low-duty rectangular wave, a line 263 indicates a mid-duty rectangular wave, and a line 264 indicates a high-duty rectangular wave.

In each rectangular wave, in one cycle, a low potential period mainly corresponds to a period of transfer of toner from the photoconductor drum 23 to the developer roller 25*a*, and a high potential period mainly corresponds to a period of transfer of toner from the developer roller 25*a* to the photoconductor drum 23. The low potential periods are periods in which voltage is higher in absolute value than in the high potential periods.

A cycle 271 of the rectangular wave of the line 262, the cycle 271 of the rectangular wave of the line 263, and the cycle 271 of the rectangular wave of the line 264 are the same. Further, phase of the rectangular wave of the line 262, phase of the rectangular wave of the line 263, and phase of the rectangular wave of the line 262 are the same.

The cycle 271 of the rectangular wave of the line 262 is divided into a high potential period 276 and a low potential period 277. The cycle 271 of the rectangular wave of the line 263 is divided into a high potential period 274 and a low potential period 275. Further, the cycle 271 of the rectangular wave of the line 264 is divided into a high potential period 272 and a low potential period 273.

The high potential period 276 is shorter than the high potential period 274, and the high potential period 274 is shorter than the high potential period 272. Further, the low potential period 277 is longer than the low potential period 275, and the low potential period 275 is longer than the low potential period 273.

Further, the potential of the high potential period 276 of the rectangular wave of the line 262 is higher than the potential of the high potential period 274 of the rectangular wave of the line 263. Further, the potential of the high potential period 274 of the rectangular wave of the line 263 is higher than the potential of the high potential period 272 of the rectangular wave of the line 264.

Further, the potential of the low potential period 277 of the rectangular wave of the line 262 is higher than the potential of the low potential period 275 of the rectangular wave of the line 263. Further, the potential of the low potential period 275 of the rectangular wave of the line 263 is higher than the potential of the low potential period 273 of the rectangular wave of the line 264.

The above relationship exists between the rectangular wave of the line 262, the rectangular wave of the line 263, and the rectangular wave of the line 264. The DC voltage is between the low potential and the high potential, and in one cycle, an average value of power generated by the square wave of the line 262, an average value of power generated by the square wave of the line 263, and an average value of power generated by the square wave of the line 264 are equal.

Here, length of the high potential period 276 of the rectangular wave of the line 262 is shorter than length of the high potential period 272 of the rectangular wave of the line 264, and therefore an amount of toner recovered from the surface of the photoconductor drum 23 to the developer roller 25*a* is smaller for the rectangular wave of the line 262 than for the rectangular wave of the line 264.

In this way, the toner recovery effect is decreased by changing the duty of the developer AC bias.

As illustrated in FIG. 11, when the fogging margin is between 110 V and 160 V, the amounts of change in the curve 254 and the amounts of change in the curve 255 are almost the same. On the other hand, when the fogging margin is between 40 V and 100 V, the amounts of change in the curve 254 are greater than the amounts of change in the curve 255.

In this way, the toner recovery effect is decreased by changing the duty of the developer AC bias. Although not illustrated, it is also possible to decrease the fogging recovery effect by lowering the frequency of the developer AC bias.

In this way, according to output characteristics when the duty of the developer AC bias is changed, as illustrated in FIG. 11, fogging is facilitated when the duty is reduced.

On the other hand, as illustrated in FIG. 11, it can be seen that even when the duty of the developer AC bias is changed, the point at which the amount of change is saturated is the same.

That is, in a range where an amount of fogging is minute (for example, a range where the fogging margin is between 110 V and 160 V, as illustrated in FIG. 11), such as a normal use fogging margin range, the DC voltage of the developer bias is high (close to 0 V), and therefore even if the duty is changed, the number of toner particles that actually transfer from the developer roller 25*a* to the photoconductor drum 23 is small (FIG. 4B), and therefore there is no large influence on changes in output values from the sensor 26. In contrast, when the fogging margin is small (for example, the range of fogging margin from 40 V to 100 V illustrated in FIG. 11), the DC voltage of the developer bias is low (close to the potential of the photoconductor drum 23), and therefore the number of toner particles that transfer from the developer roller 25*a* to the photoconductor drum 23 is large (FIG. 4A), and as described above, setting the duty to low causes more toner particles to be transferred than when the duty is high, and this greatly influences fogging characteristics.

By utilizing this, it is possible to greatly increase a change in fogging even with a small change in the fogging margin, and as a result, it is possible to minimize downtime of the image forming device due to a process of determining an appropriate fogging margin.

3. Modification 2

The following describes Modification 2 of Embodiment 1.

According to Embodiment 1, the fogging image formed on the photoconductor drum 23 is scanned by the sensor 26.

On the other hand, according to Modification 2, when the fogging margin is changed in steps, the fogging image of toner transferred from the photoconductor drum 23 to the intermediate transfer belt 21 is scanned by the sensor 31*a* and the sensor 31*b*.

Figure 13:
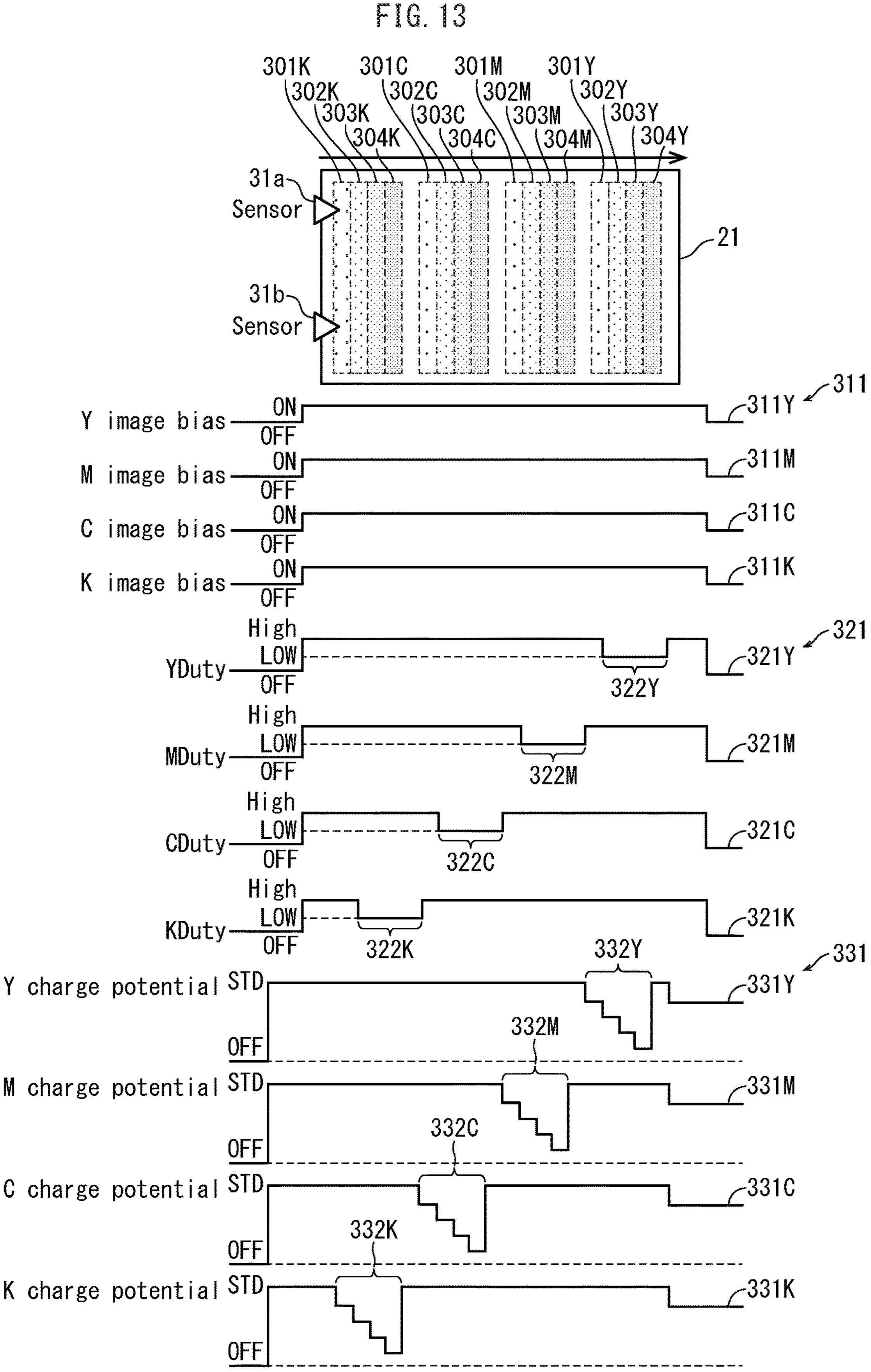
FIG. 13 illustrates waveforms of developer bias according to a developer device, waveforms of charging potential in photoconductor drum, and the like, for each color.

FIG. 13 illustrates fogging images 301K to 304K, 301C to 304C, 301M to 304M, 301Y to 304Y, formed on the intermediate transfer belt 21.

The fogging images 301K to 304K correspond to K color, the fogging images 301C to 304C correspond to C color, the fogging images 301M to 304M correspond to M color, and the fogging images 301Y to 304Y correspond to Y color.

For the sake of simplicity, each of the fogging images 301K to 304K, 301C to 304C, 301M to 304M, 301Y to 304Y is illustrated in only four steps of change.

The fogging images 301K, 302K, 303K, 304K are fogging images formed while the fogging margin is changed in steps. The same is true for the fogging images 301C to 304C, 301M to 304M, 301Y to 304Y.

Waveforms 311Y, 311M, 311C, 311K correspond to Y, M, C, K colors, respectively, and indicate developer bias in the developer device of each corresponding color.

Waveforms 321Y, 321M, 321C, 321K correspond to Y, M, C, K colors, respectively. In the waveforms 321Y, 321M, 321C, 321K, waveform parts 322Y, 322M, 322C, 322K set to "LOW" indicate timings of low duty for increasing fogging in the developer bias of the developer device of each corresponding color.

The waveforms 331Y, 331M, 331C, 331K correspond to Y, M, C, K colors, respectively, and indicate potential of the surface of the photoconductor drum 23 of each corresponding color. In the waveform 331Y, a waveform part 332Y changes in steps as the fogging margin is changed in steps. The same is also true for waveform parts 332M, 332C, 332K of the waveforms 331M, 331C, 331K, respectively. For the sake of simplicity, each of the waveform parts 332Y, 332M, 332C, 332K of the waveforms 331Y, 331M, 331C, 331K shows only four stepped changes.

Scanning by the sensors 31*a*, 31*b* of the fogging images transferred from the photoconductor drum 23 to the intermediate transfer belt 21 can be used to determine appropriate fogging margins similarly to Embodiment 1.

As described above, in a color MFP, fogging images for each color can be acquired and appropriate fogging margins for each color can be obtained in one operation.

Further, a photoconductor such as a photoconductor drum or photoconductor belt or an intermediate transfer body such as an intermediate transfer belt or intermediate transfer drum may be considered an image carrier on which a fogging image is formed, and the fogging image detected by an optical sensor or other type of sensor, and the detection results used to determine an optimum value for a fogging margin.

Note that a procedure for determining an appropriate fogging margin may be omitted for a color that is determined to be unnecessary to obtain, due to monitoring of conditions such as temperature, humidity, and number of printed sheets.

4. Other Modifications

The present disclosure describes the above Embodiments and Modifications, but is not limited to the Embodiments and Modifications described above. The following modifications are included in the present disclosure.

(1) The image forming device may be a monochrome MFP. Further, the image forming device may be a printing device that does not include the image reader 11 illustrated in FIG. 1A.

(2) The AC wave of the developer bias described above is not limited to being a rectangular wave, and may be a sine wave, for example. Further, an AC wave may be superimposed on the charger bias.

(3) The above Embodiments and Modifications may be combined.

Although one or more embodiments of the present invention have been described and illustrated in detail, the disclosed embodiments are made for the purposes of illustration and example only and not limitation. The scope of the present invention should be interpreted by the terms of the appended claims.

What is claimed is:

1. An image forming device that forms a fogging image using developer prior to forming a print image, the image forming device comprising:

an image carrier;

a charge device that electrically charges a surface of the image carrier;

a developer device that supplies developer to the image carrier;

power supply circuitry that applies a charge bias to the charge device and applies a developer bias to the developer device;

a detector that detects the fogging image formed on the image carrier;

a non-transitory computer-readable recording medium comprising a program; and a hardware processor that executes the program to operate as:

a control unit that changes a fogging margin, which is a difference between charge bias and developer bias, in steps, controls the power supply circuitry so that the charge bias and developer bias are set according to the steps, and controls the detector to detect for each step;

a calculation unit that calculates, for each step, an amount of change between a detection value detected by the detector and a detection value detected by the detector for a next step in sequence; and a determination unit that obtains, for each step, a difference between an amount of change calculated by the calculation unit and an amount of change calculated by the calculation unit for a subsequent step in the sequence, determines whether or not each obtained difference is greater than or equal to a defined value, and upon obtaining a first fogging margin range of at least one difference greater than or equal to the defined value and a second fogging margin range of at least one difference less than the defined value, determines a position of a boundary between the first range and the second range as a fogging margin to be used in forming the print image.

2. The image forming device of claim 1, wherein the developer bias is a DC voltage superimposed on an AC voltage, and the control unit sets a waveform of the AC voltage so that a recovery rate of developer from the surface of the image carrier is lower than when forming the print image.

3. The image forming device of claim 2, wherein the AC waveform is a waveform in which low voltage periods and high voltage periods cycle alternately, and the low voltage period is shorter and the high voltage period is longer than a cycle when forming the print image.

4. The image forming device of claim 1, wherein the control unit keeps the charge bias constant and changes the developer bias in steps in order to change the fogging margin in steps.

5. The image forming device of claim 1, wherein the control unit keeps the developer bias constant and changes the charge bias in steps in order to change the fogging margin in steps.

6. The image forming device of claim 1, wherein the detector detects the fogging image formed on a photoconductor as the image carrier.

7. An image forming device that forms a fogging image on a photoconductor as an image carrier using developer prior to forming a print image, the image forming device comprising:

the image carrier;

a charge device that electrically charges a surface of the image carrier;

a developer device that supplies developer to the image carrier;

an intermediate transfer body that carries the fogging image transferred from the image carrier;

power supply circuitry that applies a charge bias to the charge device and applies a developer bias to the developer device;

a detector that detects the fogging image on the intermediate transfer body;

a non-transitory computer-readable recording medium comprising a program; and a hardware processor that executes the program to operate as:

a control unit that changes a fogging margin, which is a difference between charge bias and developer bias, in steps, controls the power supply circuitry so that the charge bias and developer bias are set according to the steps, and controls the detector to detect for each step;

a calculation unit that calculates, for each step, an amount of change between a detection value detected by the detector and a detection value detected by the detector for a next step in sequence; and a determination unit that obtains, for each step, a difference between an amount of change calculated by the calculation unit and an amount of change calculated by the calculation unit for a subsequent step in the sequence, determines whether or not each obtained difference is greater than or equal to a defined value, and upon obtaining a first fogging margin range of at least one difference greater than or equal to the defined value and a second fogging margin range of at least one difference less than the defined value, determines a position of a boundary between the first range and the second range as a fogging margin to be used in forming the print image.

8. A fogging margin determination method used in an image forming device that forms a fogging image prior to forming a print image, comprising an image carrier, a charge device that electrically charges a surface of the image carrier, a developer device that supplies developer to the image carrier, and power supply circuitry that applies a charge bias to the charge device and applies a developer bias to the developer device, the fogging margin determination method comprising:

detecting the fogging image formed on the image carrier;

changing a fogging margin, which is a difference between charge bias and developer bias, in steps, controlling the power supply circuitry so that the charge bias and developer bias are set according to the steps, and controlling the detector to detect for each step;

calculating, for each step, an amount of change between a detection value detected and a detection value detected for a next step in sequence;

obtaining, for each step, a difference between an amount of change calculated and an amount of change calculated for a subsequent step in the sequence, determining whether or not each obtained difference is greater than or equal to a defined value, and upon obtaining a first fogging margin range of at least one difference greater than or equal to the defined value and a second fogging margin range of at least one difference less than the defined value, determining a position of a boundary between the first range and the second range as a fogging margin to be used in forming the print image.

* * * * *